United States Patent [19]
Frary et al.

[11] Patent Number: 5,971,281
[45] Date of Patent: *Oct. 26, 1999

[54] METHOD FOR STORING MULTIPLE LOGICAL DATA VOLUMES ON A SINGLE PHYSICAL VOLUME UTILIZING WRITABLE LABELS AND PHYSICAL VOLUME PRODUCED THEREBY

[75] Inventors: James M. Frary, Louisville; Michael L. Leonhardt, Longmont; Archibald W. Smith, Boulder, all of Colo.

[73] Assignee: Storage Technology Corporation, Louisville, Colo.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/703,083

[22] Filed: Aug. 26, 1996

[51] Int. Cl.⁶ .................................................. G06K 19/00
[52] U.S. Cl. ........................ 235/487; 235/385; 235/449; 235/451; 235/470
[58] Field of Search ..................................... 235/487, 454, 235/492, 493, 494, 375, 383, 385, 449, 451, 453, 470; 395/222, 228; 705/22, 28; 369/14; 360/132, 72.1

[56] References Cited

U.S. PATENT DOCUMENTS

| | | |
|---|---|---|
| 4,827,110 | 5/1989 | Rossi et al. .............................. 235/376 |
| 4,839,875 | 6/1989 | Kuriyama et al. .................. 235/385 X |
| 4,928,245 | 5/1990 | Moy et al. ............................... 364/513 |
| 5,153,842 | 10/1992 | Dlugos, Sr. et al. ............... 235/380 X |
| 5,287,414 | 2/1994 | Foster .................................. 235/383 X |
| 5,340,968 | 8/1994 | Watanabe ............................ 235/385 X |
| 5,377,121 | 12/1994 | Dimitri et al. .......................... 364/478 |
| 5,418,355 | 5/1995 | Weil ....................................... 235/375 |
| 5,424,526 | 6/1995 | Leonhardt et al. ..................... 235/407 |
| 5,565,858 | 10/1996 | Guthrie ............................... 235/385 X |
| 5,567,927 | 10/1996 | Kahn et al. ......................... 235/385 X |

FOREIGN PATENT DOCUMENTS

| | | |
|---|---|---|
| 2-667-183 | 3/1992 | France . |
| 2-185497 | 7/1990 | Japan . |

*Primary Examiner*—Michael G. Lee
*Attorney, Agent, or Firm*—Brooks & Kushman P.C.

[57] ABSTRACT

A method and device for storing and using information associated with multiple logical volumes stored on a single physical volume associated with a data storage system. The invention uses writable labels to read and write metadata associated with the multiple logical volumes. Metadata stored on a writable label associated with each physical volume is available without either reading the physical volume itself or accessing a host computer's control data set.

1 Claim, 8 Drawing Sheets

FIG. 9A
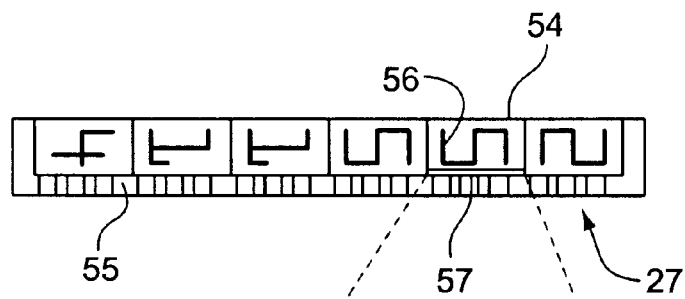
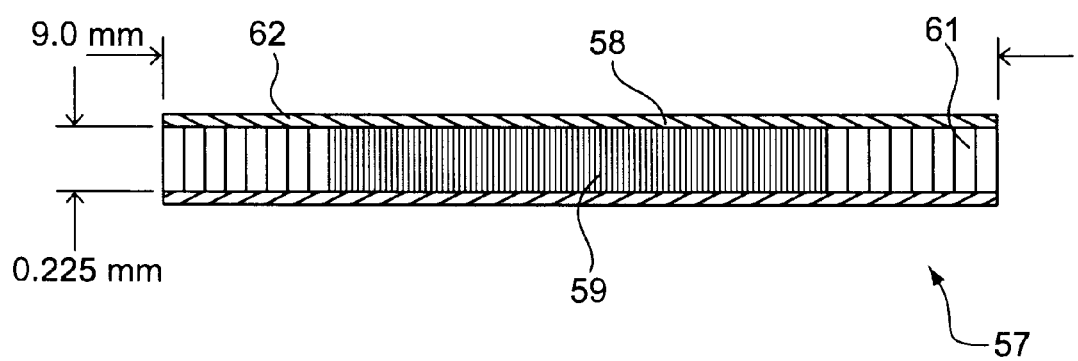
FIG. 9B

METHOD FOR STORING MULTIPLE LOGICAL DATA VOLUMES ON A SINGLE PHYSICAL VOLUME UTILIZING WRITABLE LABELS AND PHYSICAL VOLUME PRODUCED THEREBY

BACKGROUND OF THE INVENTION

1. Field of the Invention

The invention relates to information processing system organization. More particularly, the invention relates to a file management system. In still greater particularity, the invention relates to a labeling system. By way of further characterization, but not by way of limitation thereto, the invention is a method for storing multiple logical volumes of data on a single physical volume which method includes storing information on a writable label associated with the physical volume.

2. Description of the Related Art

The data processing industry stores large amounts of digital data on magnetic tapes, magnetic disks, optical tapes, optical disks, semiconductor memories, and the like. These media devices, generally referred to herein as physical volumes, may be implemented for example in the form of cassettes, cartridges, reels, modules and the like. The 3480 tape cartridge (developed by IBM Corp., Armonk N.Y.) is an example of an industry standard for magnetic tape storage media. The 3480 cartridge is a single—reel cartridge which houses a length of one—half inch wide magnetic tape.

In a typical data processing application, data is manipulated in the form of "data sets". Each data set comprises a collection of logically related information that is often termed a "logical volume". Typically, only one logical volume has been stored on a physical volume. Recently, the capacity of physical volumes has increased much faster than the size of a typical data set. For example, because of advances in media and recording technologies, the storage capacity of the 3480 form factor magnetic tape cartridge has increased by a factor of 25 since it was first introduced. This mismatch between logical volume size and physical volume capacity has prevented anticipated storage system performance improvements from being fully realized.

Potential performance improvements can be achieved in two key aspects of storage system operation. These include access time and cost of media. When a single logical volume is stored on a single physical volume, the time to access each logical volume includes the time required to exchange each physical volume between the read/write device and the storage location of the physical volume. The cost of the media used to store a single logical volume is equal to the cost of the physical volume, regardless of whether it utilizes the full capacity or only a small portion of it. If multiple logical volumes can be stored on a single physical volume, both the access time and the cost of storage can be reduced. Such a process is called "volume stacking" and the resulting physical volume is termed a "stacked volume". These logical volumes are also known as "virtual volumes" because they no longer must be associated with a single physical volume, but can be managed independently. The access time to multiple logical volumes on the stacked volume will be reduced by elimination of the time involved in the physical volume exchange. Media cost will be reduced by virtue of the efficient utilization of the full capacity of physical volumes, thereby reducing the total number of physical volumes required for storing a given number of data sets.

Unfortunately, the file management systems which manipulate the storage and retrieval of data sets were not originally designed to handle more than one logical volume per physical volume. Therefore, the potential performance advantages can be realized only if methods for managing these "virtual volumes" on stacked volume cartridges are devised. These methods must facilitate the tasks of generation, management, and distribution of information concerning relationships between logical volumes and physical volumes.

Prior art systems use a label adhered directly to the physical volume (e.g. cartridge) for identification. Serial or other identification numbers on the label can be used to distinguish the physical volumes from each other. A volume serial number (VOLSER) expressed in alpha—numeric characters and/or bar codes is traditionally used. In the traditional case of one logical volume stored on one physical volume, the VOLSER has existed in a one-to-one relationship with the data set name. Because the data set(s) stored in each physical volume is changeable, it is desirable to keep a record of its contents. Such records are frequently maintained in a computer system. Whenever specific information about the physical volume or the data stored therein is required, manual or automated apparatus read the identification label and transmit this information to the computer system. The computer system then matches a stored data record with the physical volume's VOLSER. In some systems, a summary of the contents of a cartridge is written on the media in the cartridge. In order to obtain this information, the cartridge must be accessed, loaded and read. An example utilizing such prior art labeling is StorageTek Model 4410 Automated Cartridge System (ACS) available from Storage Technology Corp., Louisville, Colo. The ACS includes automated apparatus to read identification labels on tape cartridges. The identification labels include a bar coded identification number. A look up table known as a Control Data Set (CDS) in a host computer provides a cross reference between the identification number and the contents of the tape cartridge.

While prior art systems, such as those employing the CDS referred to above could be utilized to manage stacked volume information, such prior art systems present disadvantages. A CDS can work effectively in a stacked volume situation but only if the system remains completely "closed." That is, as long as no additional physical volumes are introduced into, or removed from, the system, a CDS could be used. However, if physical volumes are entered or removed, major system performance degradation will be encountered. The performance degradation results from the time required to take the physical volume which is introduced into or removed from the system, mount it in a drive, and read and interpret its contents in order to update the CDS. Even if a range of serial numbers in a VOLSER set were dedicated to identify a stacked volume, the physical volume's contents would still have to be determined through the access, mounting, and reading processes. Corruption of the CDS is also possible which would require the reading of all tapes in the library to reconstruct the CDS. It would thus be desirable to have a method for tracking multiple data sets which, through volume stacking, are contained within a single physical volume.

SUMMARY OF THE INVENTION

The invention is a method for storing data associated with each of a multiple of logical volumes of information which have been stored on a single physical volume. The data is stored on a writable (including rewritable) and readable label associated with the physical volume. Thus, multiple logical volumes of diverse information may be stored on a physical media such as a magnetic tape cartridge without the need to independently track the information associated with each logical volume. The invention uses a label including an electromagnetic transponder or an optical media to store the data associated with each logical volume on the physical volume.

The invention enables logical volumes of information to be manipulated and tracked using the data stored on the label. When it is desired to know the contents of the physical media it can be accomplished without using the read device required to read the media in the physical volume. Use of the method of the invention results in significant improvements in disaster or error recovery situations. It also simplifies exchanges of physical volumes between libraries, systems, and enterprises because a CDS or the like can be updated as to each logical volume on the physical volume without loading and reading of the media in the volume. This eliminates the restriction of maintaining a completely closed system when stacked volumes are used.

BRIEF DESCRIPTION OF THE DRAWINGS

FIG. 9A illustrates an optical storage label;

FIG. 9B is an expanded view of the optical media portion of the optical storage label;

DESCRIPTION OF THE PREFERRED EMBODIMENT

Figure 1:
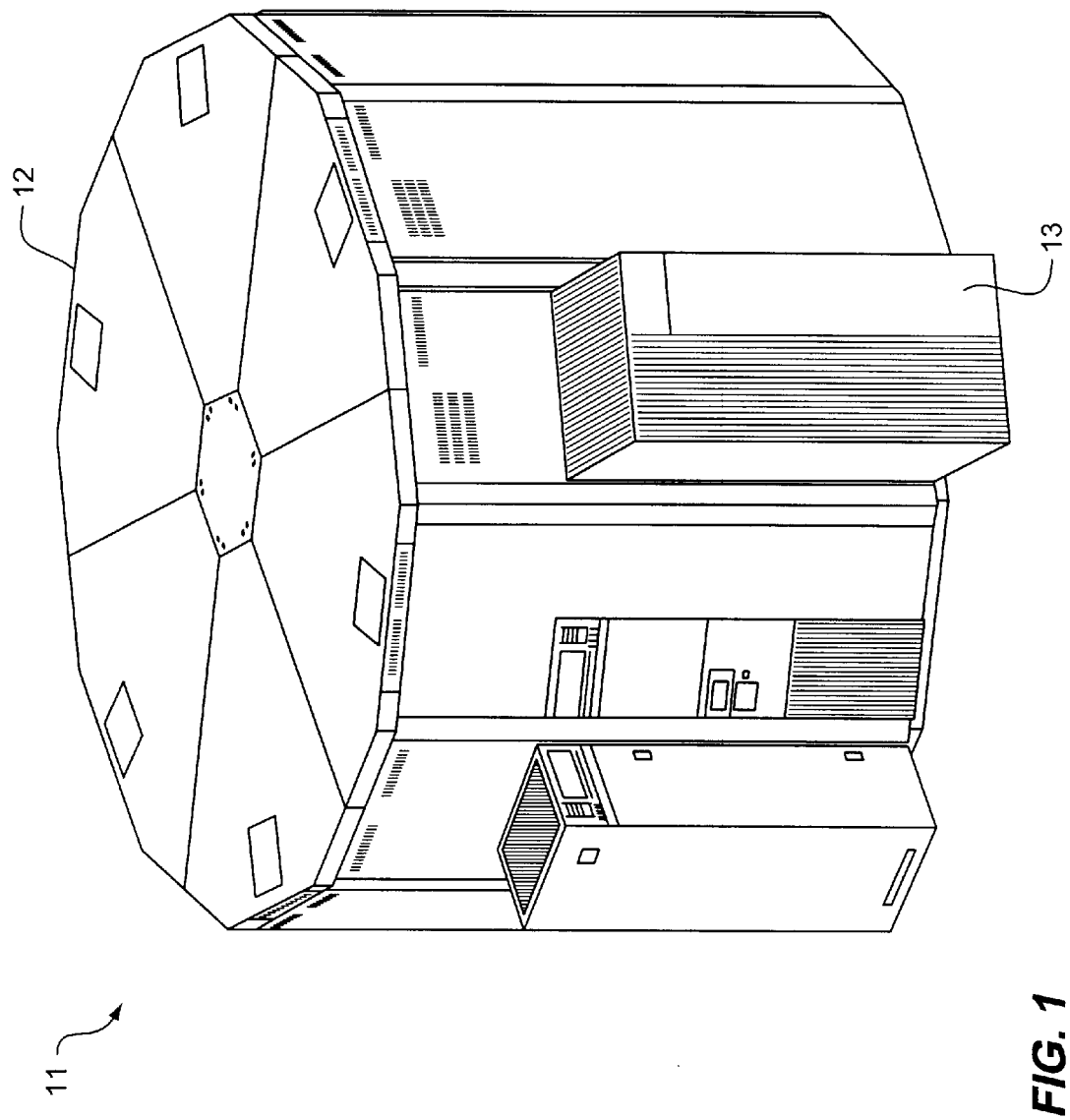
FIG. 1 illustrates the LSM of the Storage Technology Corporation Model 4400 automated cartridge system.

The preferred embodiment of the invention is discussed in detail below. While specific part numbers, configurations, and mathematical specifications are discussed, it should be understood that this is done for illustration purposes only. A person skilled in the relevant art will recognize that other components, configurations, and specifications may be used without departing from the spirit and scope of the invention. Like reference numerals denote like elements throughout each of the various figures.

The invention is described in the environment of a Storage Technology Corporation Model 4400 Automated Cartridge System (ACS). The method, however, may be used with any physical volume management system whether manual or automated. As used herein, the term "physical volume" refers to any data storage product (e.g., magnetic tape cartridge or cassette, magnetic disk, optical tape, optical disk, semiconductor memory module, etc.).

Figure 2:
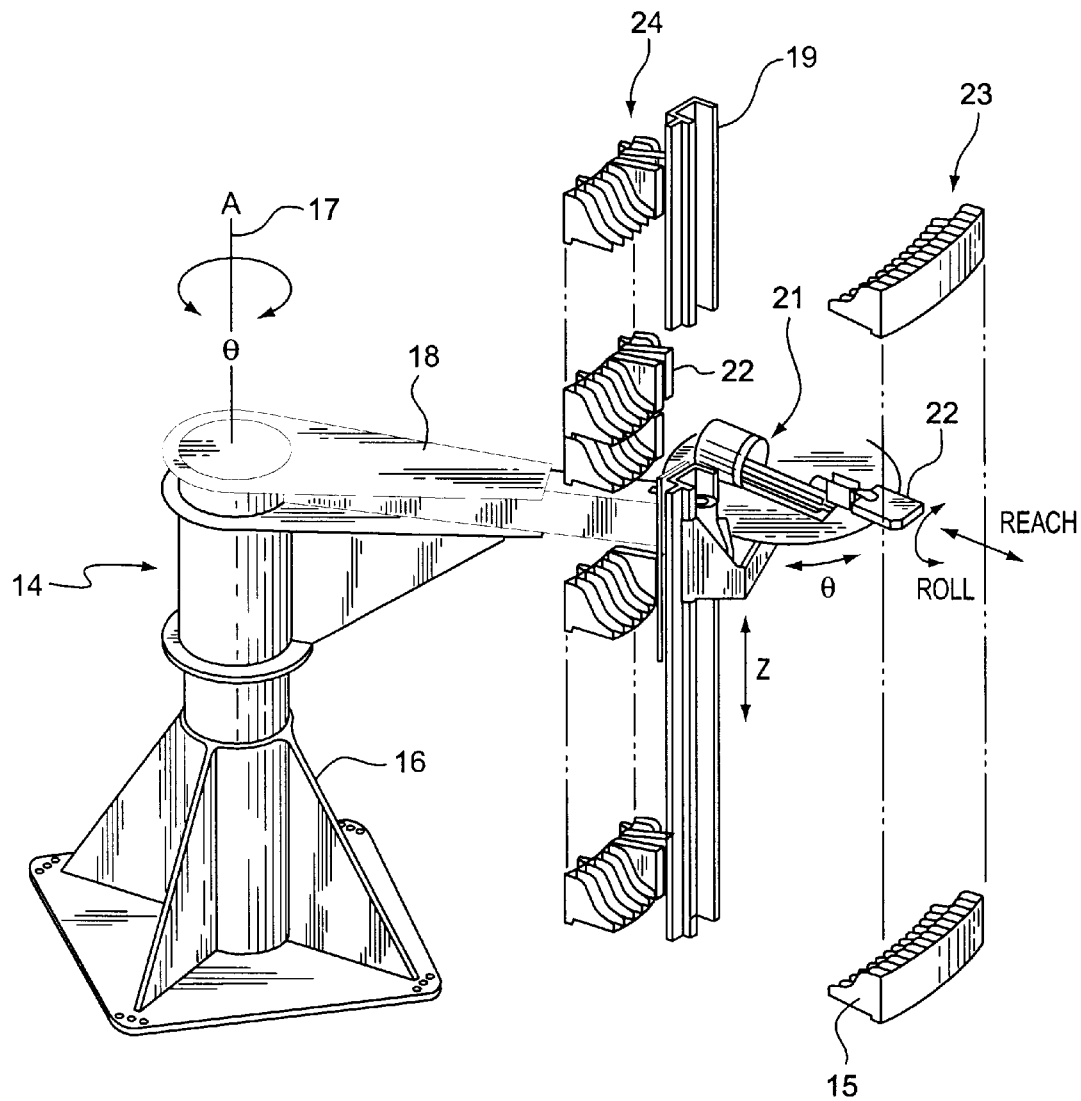
FIG. 2 illustrates the robot assembly and cartridge storage bins of the Storage Technology Corporation Model 4400 automated cartridge system.

FIGS. 1 and 2 illustrate an ACS 11. ACS 11 includes a Library Storage Module (LSM) 12. A tape drive 13 is coupled to a side of LSM 12. FIG. 2 illustrates a robot assembly 14 and a plurality of cartridge storage bins 15 which are disposed within LSM 12. Robot 14 is positioned in the center of LSM 12 and includes a base portion 16 defining a vertical axis of rotation 17. A theta arm 18 rotates about axis 17. A vertically disposed Z arm 19 is coupled to a distal end of theta arm 18. A robotic hand assembly 21 is coupled for vertical movement along Z arm 19. Robotic hand assembly 21 is configured to retrieve a tape cartridge 22 housing from a storage bin 15 and to deliver cartridge 22 to tape drive 13.

A first plurality 23 of bins 15 are arranged around the inner wall of LSM 12. A second plurality 24 of bins 15 are arranged in a circular configuration inward from and concentric with the first plurality 23 of bins 15. Robotic assembly 21 may pivot to reach a cartridge in any bin 15. An example of a Storage Technology Corporation ACS is described in U.S. Pat. Nos. 4,864,511, 4,928,245, and 4,932,826 to Moy et al., which are incorporated herein by reference.

Figure 13:
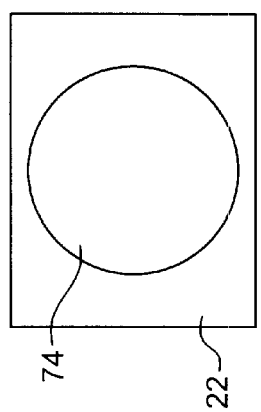
FIG. 13 illustrates a physical volume including magnetic disk media.
Figure 12:
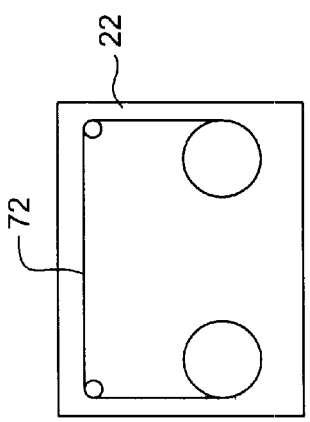
FIG. 12 illustrates a physical volume including optical tape media.
Figure 15:
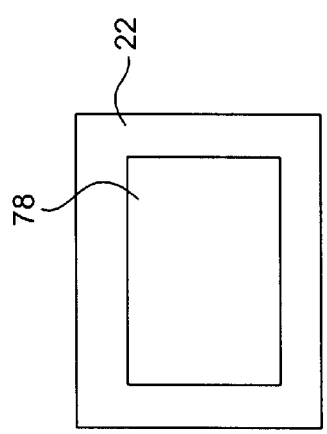
FIG. 15 illustrates a physical volume including semiconductor media.
Figure 14:
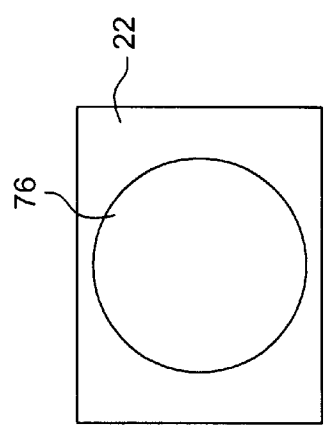
FIG. 14 illustrates a physical volume including optical disk media.

In the conventional ACS 11, robot assembly 14 includes a camera-and-light assembly which identifies cartridge 22 by a bar-coded label attached thereto. The present invention replaces or supplements the bar code system with an EMT (ElectroMagnetic Transponder) label system. The EMT label system includes a plurality of data labels. Each label is configured for physical attachment to or integration into a cartridge 22 (or other physical volume). Each label includes an electromagnetic transponder for storing data associated with the cartridge and/or the information contained therein. The transponder includes a non-volatile and writable memory. In an alternate embodiment, the invention includes an optical media label system (e.g., a "high data density" label wherein the term "high data density" is used to refer to the label of the invention in which data densities are greater than 360 Kbits per square inch and preferably data densities are greater than one (1) Megabit per square inch are achieved) such as that described in U.S. Pat. No. 5,424,526 issued to Leonhardt et al and assigned to Storage Technology Corp. which is incorporated by reference herein. The physical volume 22 may include optical tape media 72 as shown in FIG. 12, magnetic disk media 74 as shown in FIG. 13, optical disk media 76 as shown in FIG. 14, and semiconductor media 78 as shown in FIG. 15.

Figure 11:
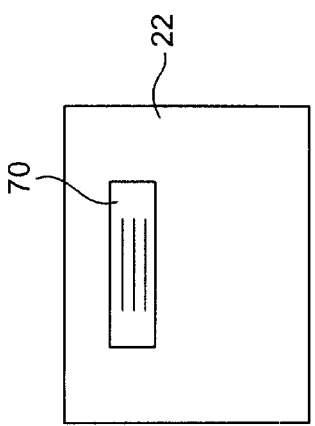
FIG. 11 illustrates the information recorded on a label constituting a volume table of contents.

The data stored in the memory of the label is referred to as "metadata". As used herein, the term "metadata" may include information such as a directory of logical volumes or data files stored in the physical volume, a log of media defects and errors, media manufacturing and format history, history of media usage, ownership, security access codes, and any other piece of information which a storage management system might use to enhance the performance and reliability of the system. As will be further described below, metadata may also include a logical volume table of contents (VTOC) as shown in FIG 11. In the present invention, the metadata is contained on an EMT label system or an optical label system associated with the physical volume itself. Metadata may thus be accessed without reading the information from the media in the physical volume (cartridge 22).

Figure 3:
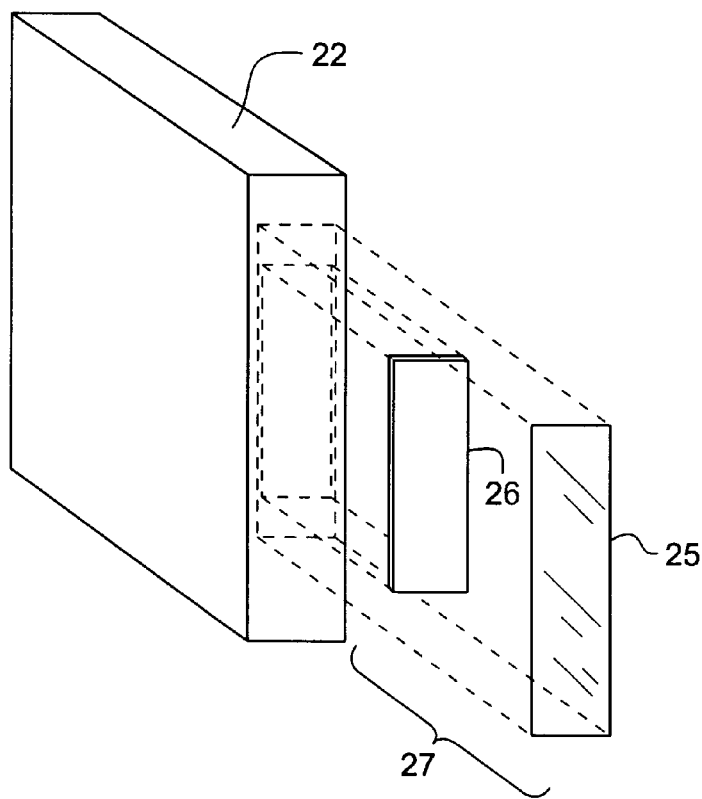
FIG. 3 illustrates the preferred embodiment of a tape cartridge and a label in accordance with the invention.

FIG. 3 illustrates a 3480 type data cartridge housing 22 utilizing the present invention. A standard adhesive-type label portion 25 is configured for attachment to an end of cartridge housing 22. Label portion 25 may have human-readable and/or machine-readable information imprinted on its outer surface. For example, label portion 25 may be a conventional label including an alphanumeric code and a bar code. An electromagnetic transponder 26 is disposed between label portion 25 and cartridge 22. In this case, an EMT label 27 is comprised of label portion 25 and transponder 26.

Figure 16:
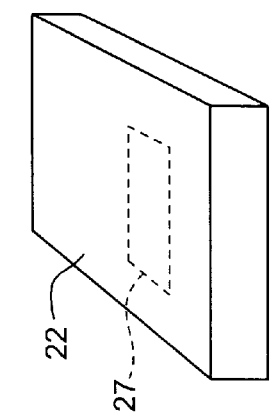
FIG. 16 illustrates the label, the electromagnetic transponder, and the optical media located within the tape cartridge.

As an alternative to the EMT label 27 shown in FIG. 3, label portion 25 and transponder 26 may be produced in a single integral label. For example, label portion 25 may be printed directly on transponder 26. Moreover, transponder 26 need not be directly coupled to label portion 25. For example, in other embodiments, transponder 26 may be integrated into or positioned within cartridge housing 22 while label portion 25 is attached to the outer surface of the cartridge housing as shown in FIG. 3. For example, refer to FIG. 16 in which label 27 is positioned within cartridge housing 22.

Label portion 25 may be similar to the conventional label and include bar-coded and human readable information. This will facilitate backward compatibility of the label of the invention with existing systems. In an alternate embodiment, however, label portion 25 may be omitted altogether such that EMT label 27 comprises only transponder 26. The term "label" as used hereinafter shall refer to label 27 including transponder 26 but not necessarily including label portion 25.

EMT technology uses an incident electromagnetic field from a transceiver to induce power generation in an antenna of a (normally passive) transponder. This power enables an active semiconductor device within the transponder to transmit a signal containing the information (metadata) stored in a memory of the transponder back to the transceiver. This is the same physical phenomenon employed in radio frequency identification (RFID) technology.

Figure 4:
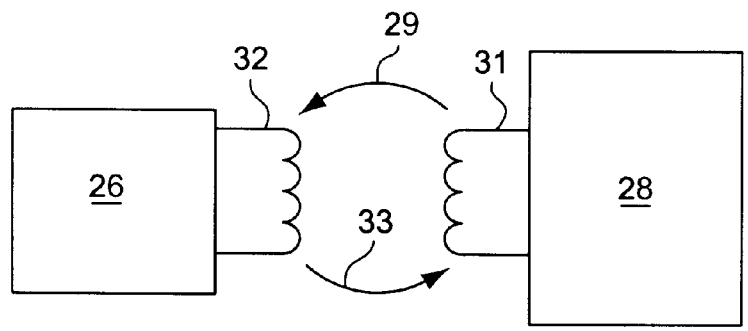
FIG. 4 is a block diagram illustrating operation of an electromagnetic transponder.

FIG. 4 illustrates operation of transponder 26. An EMT transceiver 28 is used to read data from transponder 26. An electromagnetic signal 29 is transmitted from an antenna 31 of transceiver 28 and is received by an antenna 32 of EMT transponder 26. Transponder 26 then modulates signal 29 with data stored in a memory (e.g., an electrically erasable, programmable, read-only memory, or EEPROM) of transponder 26. The modulated signal, including the data from transponder 26, is then broadcast from antenna 32 as a data signal 33. Data signal 33 is received by antenna 31 of read transceiver 28.

In this manner, data stored within transponder 26 is "read" by EMT read transceiver 28. The reading is done without requiring physical contact between transceiver 28 and transponder 26. As used herein, the terms "electromagnetic transponder" or "EMT" includes both electromagnetic and electrostatic transponder technologies. Moreover, the EMT devices may be implemented in any frequency range using free space optical frequencies. It is also possible to implement the transponder devices using sonic (ultrasound) signal transmission rather than electromagnetic signal transmission. These technologies are well known in the art. Furthermore, a variety of ways for implementing transponder 26 and read transceiver 28 will be apparent to a person skilled in the relevant art.

Figure 5:
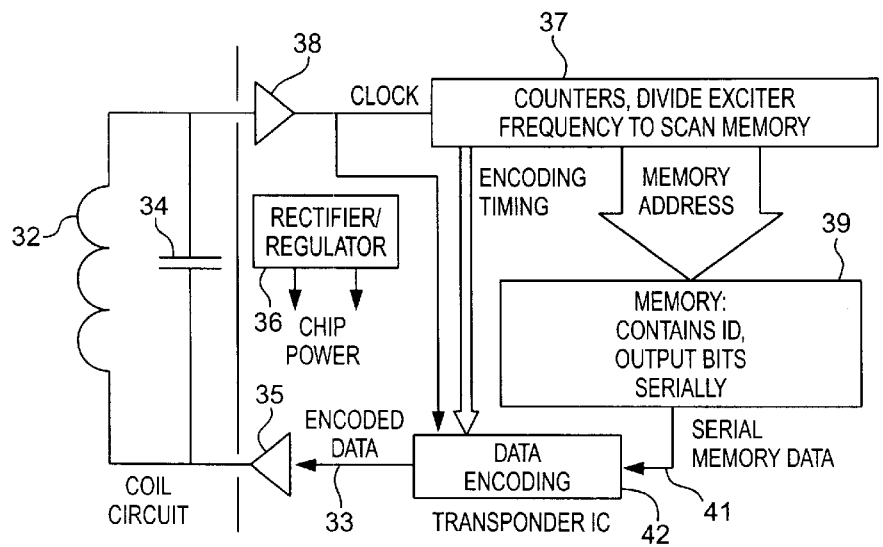
FIG. 5 is a block diagram of a read-only embodiment of a transponder.

FIG. 5 illustrates an example implementation of transponder 26. In this example, transponder 26 is a passive transponder (i.e., transponder 26 has no power source of its own). Note, however, that transponder 26 may also be an active transponder. Transponder 26 includes antenna 32, a filter capacitor 34, an input buffer 35, and a power circuit 36. Antenna 32 receives an excitation signal 29 from a transceiver 28. A portion of the energy from signal 29 is used by power circuit 36 to generate power for the active components of transponder 26. Counter 37 receives signal 29 via input buffer 38 and produces a memory address to memory 39.

In response to the memory address, memory 39 outputs a data signal (metadata) 41 to encoding circuit 42. Encoding circuit 42 outputs an encoded data signal 33 to antenna 32 through output buffer 35. The encoded data signal 33 is then transmitted by antenna 32 for receipt by transceiver 28. This is an example of full duplex mode of operation. Note that excitation signal 29 and encoded data signal 33 are simultaneously present on antenna 32.

Figure 6:
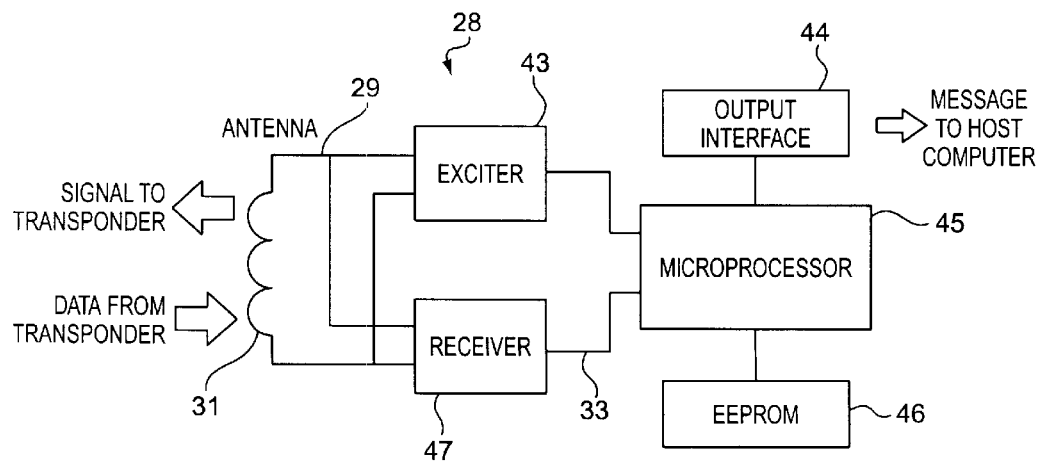
FIG. 6 is a block diagram of a read-only embodiment of a transceiver.

FIG. 6 illustrates an example implementation of transceiver 28. Transceiver 28 includes antenna 31, an exciter circuit 43, an output interface circuit 44, a microprocessor circuit 45, a memory 46, and a receiver 47. Exciter 43 produces excitation signal 29 for transmission by antenna 31. Receiver 47 receives signal 33 from transponder 26. Because signals 29 and 33 are simultaneously present on antenna 31, receiver 47 also receives excitation signal 29 directly from exciter circuit 43 and subtracts excitation signal 29 from the combined signal on antenna 31 to produce the data signal 33. It should be noted that more than one antenna may be used to enhance signal reception as suggested by engineering design considerations. Microprocessor circuit 45 controls operation of exciter circuit 43 and receives data signal 33 from receiver 47. Data signal 40 may then be stored in memory circuit 46. Output interface 44 allows data signal 33 to be output to a host computer or other system.

The examples of transponder 26 and transceiver 28 discussed above are read-only devices. The devices were selected for illustration of the principles of the EMT technology and for ease of discussion. In the preferred embodiment, however, the devices will be implemented using read/write technology. For writing data, transceiver 28 and transponder 26 operate in a manner substantially similar to when data is being read. For writing data to transponder 26, signal 29 will be modified with a data signal. The data will then be extracted from the underlying carrier signal using a receiver circuit and will be stored in memory 39 of transponder 26. Configuration and operation of a writable transponder and a read/write transceiver will be apparent to a person skilled in the relevant art. For example, the read and write function could be accomplished using separate communication channels.

Figure 7:
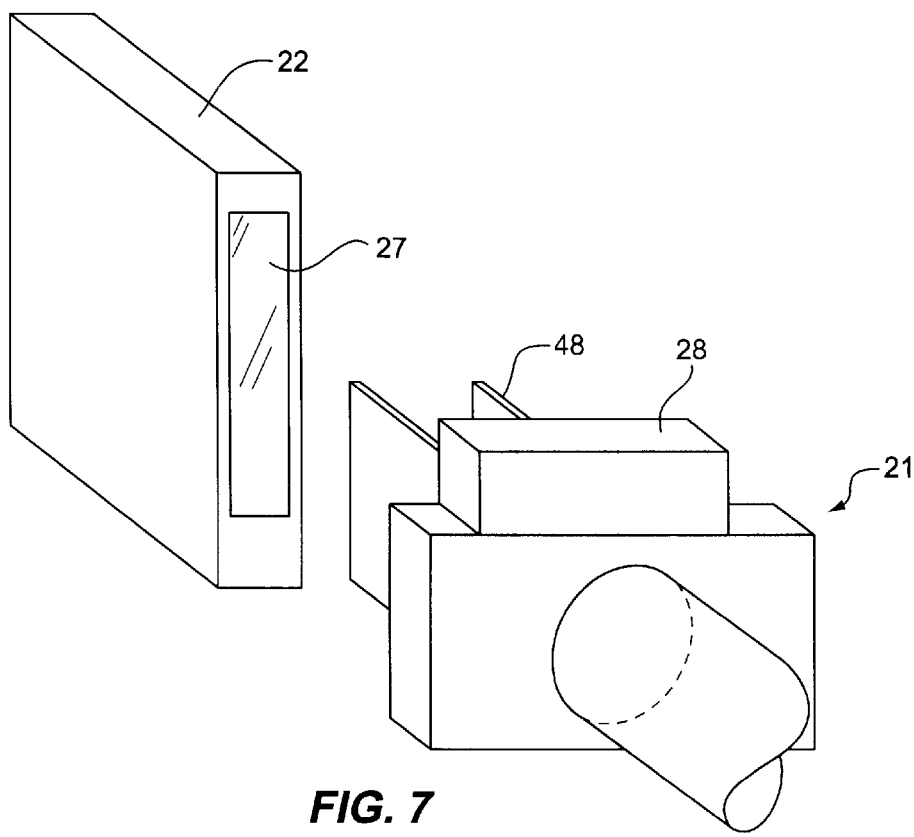
FIG. 7 is a perspective view of a robotic hand assembly having an electromagnetic transceiver mounted thereon in accordance with a preferred embodiment of the invention.

FIG. 7 illustrates an implementation of transceiver 28 in the environment of robotic hand assembly 21. Robotic hand assembly 21 includes a gripper hand 48 for grabbing tape cartridge housing 22. Transceiver 28 is positioned adjacent gripper hand 48 to allow transceiver 28 to read label 27 when gripper hand 48 is aligned with cartridge 22. Note that actual contact between gripper hand 48 and cartridge 22 is not required for interrogation of label 27.

Figure 8:
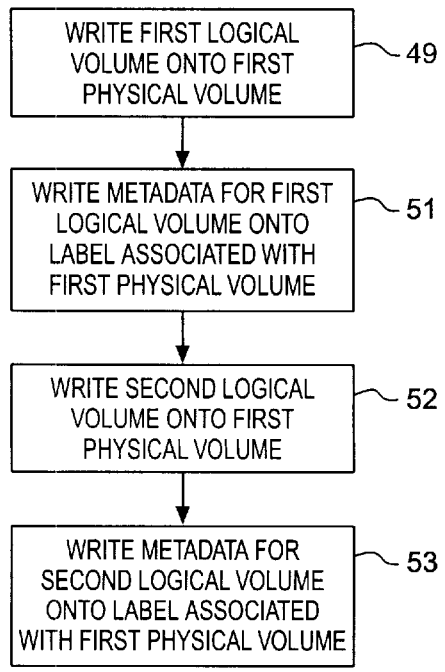
FIG. 8 is a flow chart illustrating the method of the invention.

Referring to FIG. 8 a flow chart illustrating the preferred method of the invention is shown. That is, in step 49 a first logical volume of information is written onto a first physical volume which may be magnetic media within cartridge housing 22. Either prior to, simultaneously therewith, or subsequent thereto, at step 51, metadata associated with said first logical volume of information is written onto label 27 associated with cartridge housing 22. At step 52, a second logical volume of information is written onto the same physical volume as in step 49. At step 53, metadata associated with said second logical volume is written onto label 27 associated with cartridge housing 22. This process may be continued for additional logical volumes. Thus, for each logical volume stored on a physical volume, there will exist metadata on the label associated with that physical volume which identifies that logical volume of information. Thus, by reading the metadata on the label, a table of contents for the logical volumes of information stored on the physical volume may be determined without the necessity of loading the physical volume and reading the information therefrom.

The beam of energy transmitted by read transceiver 28 is a narrow beam of electromagnetic energy. The narrow beam allows read transceiver 28 to discriminate between closely adjacent labels of closely adjacent cartridges 22 within ACS 11. Other features provided by the narrow beam of electromagnetic energy include the ability to sense whether a cartridge is present by the presence or absence of a response to interrogating signal 29. Further a signal (e.g., data signal 33) returned from label 27 may be used to fine tune the positioning of gripper hand 48 with respect to cartridge housing 22. To accomplish this, means may be provided in transceiver 28 for determining attributes (e.g., amplitude, frequency, phase) of the signal. For example, alignment of gripper hand 48 with cartridge 22 may be correlated with receipt of maximum signal power from transponder 26.

In the preferred embodiment, read transceiver 28 is configured to interrogate a label 27 at a spacing of approximately 4.75 inches. Interrogating signal 29 has a beam width sufficiently narrow to discriminate between a plurality of transponders 26 which are arrayed on approximately 1.5-inch centers horizontally and 4.5 inch centers vertically within ACS 11. Transponder 26 contains a non-volatile read/write semiconductor memory (e.g., EEPROM, FRAM) which may, for example, have a one kilobyte capacity. Transfer of data between transponder 26 and transceiver 28 takes place at a rate which may, for example, be one megabyte per second. Transceiver 28 provides a bi-directional, eight-bit parallel input/output port (output interface 44) for communication with a processor/controller of ACS 11.

EMT technology is well known in the art. For example, suitable transponders 26, read transceivers 28 and write transceivers are generally available from Hughes Identification Devices, Boulder, Colo. The particular EMT devices used will depend on the particular application. Off-the-shelf EMT components may be available for some applications. Other applications may require custom designed components.

The preferred embodiment has been described with transceiver 28 present on robotic hand assembly 21. Many alternate embodiments may be envisioned. For example, read transceiver 28 may be located further away from gripper hand 48, with only antenna 31 of transceiver 28 being positioned anywhere within or on the surface of the robot hand 21. Furthermore, it is desirable in the preferred embodiment that a transceiver 28 also be provided on each media drive. This will allow the data in a transponder to be read and/or modified in conjunction with read/write operations to the tape media. The preferred embodiment of the invention has been described in the environment of an ACS 11. The invention, however, will also find application in a manual information management system. For example, transceiver 28 may be incorporated into a hand-held wand.

In a practical system, it is necessary to read and write the metadata without physical contact and with a high areal density of stored bits. In addition to the preferred embodiment utilizing ultra-high or microwave frequencies to transmit data to and from a semiconductor device 39 associated with the physical volume, an optical system may be utilized. One such optical system is described in U.S. Pat. No. 5,424,526 entitled, "High Data Density Label and System Using Same" which patent is commonly assigned with the present application.

Referring to FIG. 9A, the metadata corresponding to a logical volume stored on the physical volume is optically read and written onto label 27. Label 27 is similar to a conventional tape cartridge label in that label 27 includes a substrate or body portion 54 upon which machine readable symbols 55 (e.g. optical bar code) and human-readable symbols 56 (e.g. alphanumeric identifier) are printed. Additionally, label 27 includes a high density optical media portion 57 for storing data in optical format. In an alternate embodiment, substrate portion 54 may be implemented as an adhesive for optical media portion 57.

Referring to FIG. 9B an expanded view of optical media portion 57 is shown. A data area 58 is used to record, for example, 90 kilobytes of data by writing short data tracks 59 perpendicular to the length of the optical media portion 57. Data tracks 59 are written by a laser beam which is rapidly scanned perpendicular to the length of optical media 57, while an optical head is moved more slowly parallel to the length of optical media 57.

As described in U.S. Pat. No. 5,424,526, and as is well known to one skilled in the optical recording art, pre-groove structures may be used in data area 58 to precisely guide the scanning laser beam. In addition, the data bit stream is not recorded directly, but is first encoded to include re-clocking patterns, error correction bits, resynchronization patterns, and identification bits, etc. Either pulse width modulation (PWM) or pulse position modulation (PPM) may be used to encode the bit streams. Optical media of the phase change type is suitable for optical label applications. A typical recording density is 400 Mbits/sq. in. although this density may be varied.

Optical media portion 57 further includes pre-formatted lead-in and lead-out track regions 61 at the end of the data area 58, which facilitate both track positioning and data clocking acquisitions. In addition, coarse positioning patterns 62 may be placed at each side of the data area 58 and lead-in out track regions 61. Coarse positioning patterns 62 assist in positioning an optical scanner when it is not properly aligned with optical media portion 57. Pregroove and positioning features can be formed by standard injection molding or embossing techniques.

Figure 10:
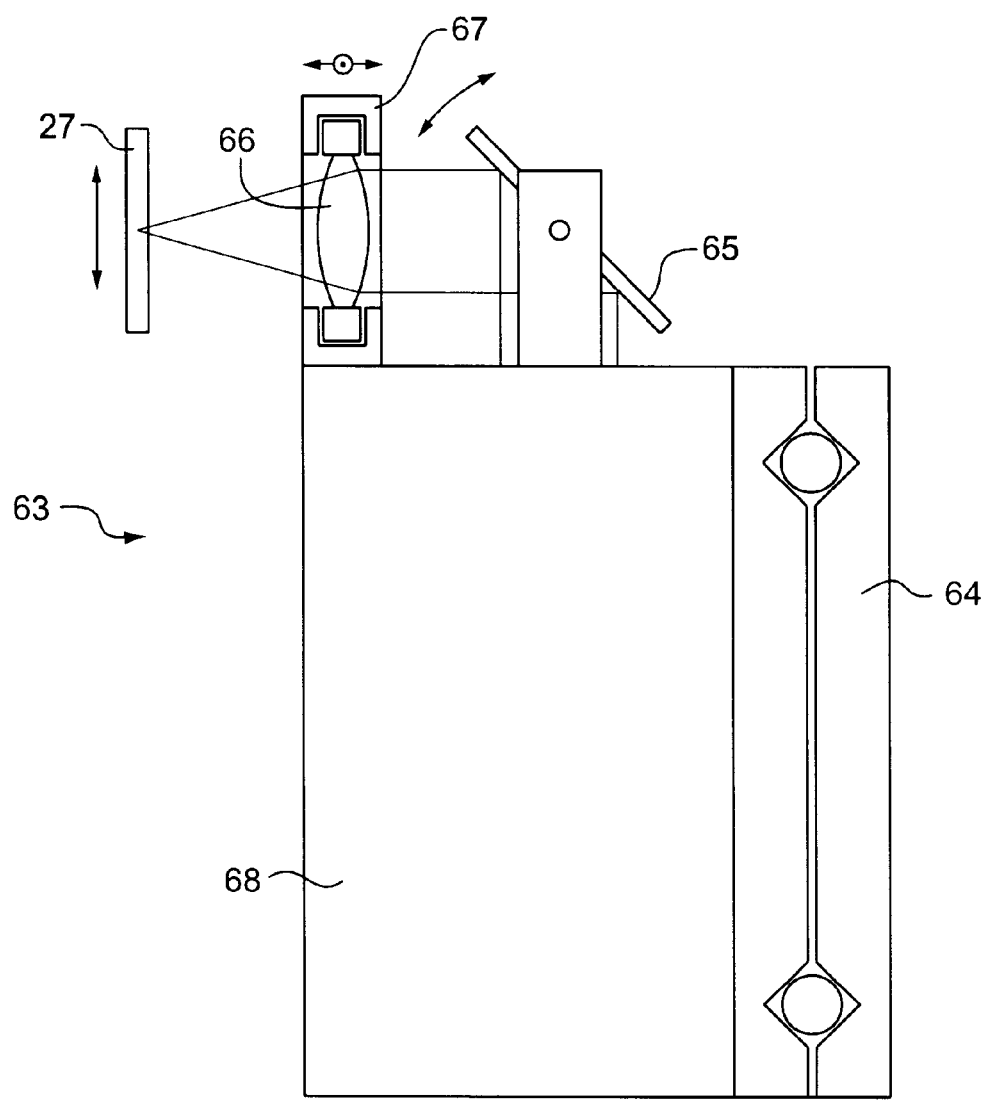
FIG. 10 illustrates an optical scanner for reading the optical storage label.

Referring to FIG. 10, in the preferred alternate embodiment of the invention, an optical scanner 63 is used to read data from, and write data to, optical media portion 57 of label 27. Optical scanner 63 includes a linear slide mechanism 64, a scanning mirror 65 and an objective lens 66.

Linear slide mechanism 64 is configured to move the optical scanner along the length of optical media portion 57. The scanning mirror 65 is provided to rapidly scan an optical beam across the data tracks 59 of optical media portion 57. Objective lens 66 focuses the laser beam on the optical media portion 57, and a lens actuator 67 is provided to maintain the focus and beam position along the data tracks 59. A fixed optics package 68 and its operation are described in U.S. Pat. No. 5,424,526 and will be readily understandable to those skilled in the optical recording art.

With the scanning system shown in FIG. 10, the sample label illustrated in FIG. 9B could be read in approximately one second with an average transfer rate of 1 Mbit/sec and a scan speed of 1000 mm/sec. This is achieved in a simple, low-cost way using a resonant scanning mirror with a frequency of approximately 2.5 KHz and a peak to peak deflection of approximately 5 degrees.

Precise positioning of optical scanner 63 with respect to label 27 is important. In the preferred embodiment in which label 27 is configured for use with a tape cartridge, relative positioning is achieved by mounting the optical scanner 63 on a robotic hand assembly, as illustrated for the electromagnetic transponder embodiment in FIG. 7. Robotic hand assembly 21 includes a gripper hand 48. For the alternate embodiment, optical scanner 63 is substituted for the transponder 28. When gripper hand 48 engages the cartridge, the optical scanner 63 is positioned to read the label 27. As described in U.S. Pat. No. 5,424,526, additional alignment structures may be added to robotic hand assembly 21 if required to assure accurate alignment of the optical beam on the optical media portion 57. As with the electromagnetic transponder embodiment, the optical label could be included within cartridge housing 22. As is known to one skilled in the art, a portion of housing 22 could be made transparent to allow optical reading of the label from outside housing 22.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. In a multiple magnetic tape cartridge management system, a method for storing and tracking multiple logical volumes of data written on magnetic tape media of a single magnetic tape cartridge to reduce access time to the multiple logical volumes written on the magnetic tape media of the single magnetic tape cartridge, the consisting of:

writing a first logical volume of data onto magnetic tape media of a single magnetic tape cartridge;

recording information associated with said first logical volume including a first logical volume table of contents onto a writeable and readable label attached to outside of said single magnetic tape cartridge;

writing a second volume of data onto the magnetic tape media of said single magnetic tape cartridge;

recording information associated with said second logical volume including a second logical volume table of contents onto said label;

recording information including a directory of said first and second logical volumes written on the magnetic tape media of said single magnetic tape cartridge onto said label;

reading said information on said label to determine the multiple logical volumes, and the contents of each of the multiple logical volumes, written on the magnetic tape media of said single magnetic tape cartridge without loading said single magnetic tape cartridge and reading the multiple logical volumes from the magnetic tape media; and wherein said label includes an electromagnetic transponder and/or an optical media, said electromagnetic transponder and/or said optical media is configured to store data in an electromagnetic and/or optical format, having an areal density greater than three hundred and sixty (360) Kilobits per square inch.

* * * * *